(12) United States Patent
Plantenga et al.

(10) Patent No.: US 6,566,296 B2
(45) Date of Patent: May 20, 2003

(54) PROCESS FOR PREPARING AN ADDITIVE-BASED MIXED METAL CATALYST, ITS COMPOSITION AND USE

(75) Inventors: Frans Lodewijk Plantenga, Amersfoort (NL); Sonja Eijsbouts, Nieuwkuijk (NL); Marinus Bruce Cerfontain, Amsterdam (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/904,316

(22) Filed: Jul. 12, 2001

(65) Prior Publication Data

US 2002/0010086 A1 Jan. 24, 2002

Related U.S. Application Data

(60) Provisional application No. 60/277,733, filed on Mar. 21, 2001.

(30) Foreign Application Priority Data

Jul. 12, 2000 (EP) .............................. 00202468

(51) Int. Cl.$^7$ .............................. B01J 31/00; B01J 23/00
(52) U.S. Cl. ..................... 502/162; 502/150; 502/170; 502/313; 502/314; 502/315; 502/316
(58) Field of Search ................. 502/162, 150, 502/170, 313–316

(56) References Cited

U.S. PATENT DOCUMENTS

| | | | |
|---|---|---|---|
| 2,744,052 A | 5/1956 | Nokazi ................. 196/24 |
| 3,678,124 A | 7/1972 | Stepanov et al. ....... 260/680 E |
| 4,596,785 A | 6/1986 | Toulhoat et al. ........... 502/220 |
| 4,820,677 A | 4/1989 | Jacobson et al. .......... 502/220 |
| 6,280,610 B1 * | 8/2001 | Uragami et al. ........ 208/216 R |
| 6,331,574 B1 * | 12/2001 | Lapidus et al. ............ 518/709 |

FOREIGN PATENT DOCUMENTS

| | | | | |
|---|---|---|---|---|
| EP | 0 304 231 A2 | 2/1989 | ............ C22B/7/00 |
| EP | 0 451 640 A2 | 10/1991 | ........... C10G/45/08 |
| EP | 0 482 818 A1 | 4/1992 | ........... C10G/45/08 |
| EP | 0 601 722 A1 | 6/1994 | ........... C10G/45/08 |
| GB | 1 282 949 | 7/1972 | ........... C01G/39/00 |
| WO | WO 94/25157 | 11/1994 | ............ B01J/33/00 |
| WO | WO 96/41848 | 12/1996 | ........... C10G/45/08 |
| WO | WO 99/03578 | 1/1999 | .......... B01J/23/883 |
| WO | WO 00/41810 | 7/2000 | ............ B01J/37/02 |
| WO | WO 00/41811 | 7/2000 | ............ B01J/37/03 |

OTHER PUBLICATIONS

European Patent Office Abstract of JP 09000929, dated Jul. 1, 1997 Catalyst for Hyrodesulfurization of Light Oil.
International Patent Application Search Report of PCT/EP01/07733 Nov. 2001.
Applied Surface Science 121/122 (1997) pp. 433–436, High HDS activity of Co–Mo/Al$_2$O$_3$ modified by some chelates and their surface fine structures. Hiroshima; et al. Feb. 1997.
Derwent Abstract No. 92–246393/30 abstracting JP 04–166231 Jun. 1992.
Derwent Abstract No. 92–246394/30 abstracting JP 04–166232 Jun. 1992.
Derwent Abstract No. 92–246395/30 abstracting JP 04–166233 Jun. 1992.
Derwent Abstract No. 95–063417/09 abstracting JP 06–339635 Dec. 1994.
Derwent Abstract No. 94–282690/35 abstracting JP 06–210182 Aug. 1994.
Japanese Machine Translation No. 9–929 for JP 97000929A Jan. 1997.

* cited by examiner

Primary Examiner—Mark L. Bell
Assistant Examiner—Patricia L. Hailey
(74) Attorney, Agent, or Firm—Louis A. Morris

(57) ABSTRACT

The present invention pertains to a process for preparing a catalyst composition wherein at least one Group VIII non-noble metal component and at least two Group VIB metal components are combined and reacted in the presence of a protic liquid, after which the resulting composition is isolated and dried, the total of the Group VIII and Group VIB metal components, calculated as oxides, making up at least about 70 wt. % of the catalyst composition, calculated on dry weight. An organic oxygen-containing additive is added prior to, during, or subsequent to the combining and reacting of the metal components in such an amount that the molar ratio of the total amount of additive added to the total amount of Group VIII and Group VIB metal components is at least about 0.01. The invention also pertains to additive-containing catalysts obtained by this process, and to their use in hydroprocessing.

39 Claims, No Drawings

_US 6,566,296 B2_

PROCESS FOR PREPARING AN ADDITIVE-BASED MIXED METAL CATALYST, ITS COMPOSITION AND USE

CROSS REFERENCE TO RELATED APPLICATIONS

This application claims priority from EP 00202468.5, filed Jul. 12, 2000 and from U.S. Provisional Application No. 60/277,733, filed Mar. 21, 2001, both of which are incorporated herein by reference in their entirety.

BACKGROUND OF THE INVENTION

1. Field of the Invention

The invention relates to a process for preparing a catalyst composition, the catalyst composition thus obtained and the use of the composition in hydroprocessing applications.

2. Discussion of the Prior Art

Catalysts comprising at least one Group VIII non-noble metal component and at least two Group VIB metal components, the Group VIII and Group VIB metal components making up at least 50 wt. % of the catalyst composition, calculated as oxides, are known in the art.

U.S. Pat. No. 4,596,785 describes a catalyst composition comprising the disulfides of at least one Group VIII non-noble metal and at least one Group VIB metal. U.S. Pat. No. 4,820,677 describes a catalyst comprising an amorphous sulfide comprising iron as the Group VIII non-noble metal and a metal selected from molybdenum, tungsten or mixtures thereof as the Group VIB metal, as well as a polydentate ligand such as ethylene diamine. In both references the catalyst is prepared via the co-precipitation of water-soluble sources of one Group VIII non-noble metal and two Group VIB metals in the presence of sulfides. The precipitate is isolated, dried, and calcined in an inert atmosphere, which means that sophisticated techniques are required to carry out these processes.

U.S. Pat. No. 3,678,124 discloses oxidic catalysts to be used in the oxidative dehydrogenation of paraffin hydrocarbons. The catalysts are prepared by co-precipitating water-soluble components of the Group VIB metals and Group VIII non-noble metals.

In WO 9903578 catalysts are prepared by co-precipitating specified amounts of a nickel, molybdenum, and tungsten source in the absence of sulfides.

Non-prepublished international patent application PCT/EP00/00354 (corresponds to U.S. patent application Ser. No. 09/482,811, filed Jan. 13, 2000, incorporated herein by reference thereto) describes the preparation of sulfided catalyst compositions by coprecipitation of at least one Group VIII non-noble metal component and at least two Group VIB metal components to form an oxygen-stable precipitate, which is subsequently sulfided. Non-prepublished international patent application PCT/EP00/00355 (corresponds to U.S. patent application Ser. No. 09/231,118, filed Jan. 15, 1999, incorporated herein by reference thereto) describes the preparation of a catalyst composition by contacting at least one Group VIII non-noble metal component and at least two Group VIB metal components in the presence of a protic liquid, wherein at least one of the metal components is at least partly in the solid state during contacting.

Although the catalysts of some of these references, in particular those of Non-prepublished international patent applications PCT/EP00/00354 and PCT/EP00/00355 show a high activity, there is still need for improvement thereof.

SUMMARY OF THE INVENTION

Accordingly, the present invention, in one embodiment, pertains to a process for preparing a catalyst composition wherein at least one Group VIII non-noble metal component and at least two Group VIB metal components are combined and reacted in the presence of a protic liquid, after which the resulting composition is isolated and dried, the total of the Group VIII and Group VIB metal components, calculated as oxides, making up at least about 50 wt. % of the catalyst composition, calculated on dry weight. The process requires that an organic oxygen-containing additive is added prior to, during, or subsequent to the combining and reacting of the metal components in such an amount that the molar ratio of the total amount of additive added to the total amount of Group VIII and Group VIB metal components is at least about 0.01.

In a second embodiment, the present invention comprises a catalyst composition comprising at least one Group VIII non-noble metal component and at least two Group VIB metal components. The catalyst composition further comprises at least about 0.01 mole of an organic oxygen-containing additive per mole of the total of Group VIB metals and Group VIII non-noble metals present in the catalyst composition. The total of the Group VIII and Group VIB metal components, calculated as oxides, make up at least about 50 wt. % of the catalyst composition, calculated on dry weight.

In a third embodiment, the present invention comprises the use of the above catalyst composition for the hydroprocessing of hydrocarbon feedstocks by contacting the feedstocks with the catalyst composition at hydroprocessing conditions. Optionally, the catalyst composition may first be sulfided.

Other objectives and embodiments of the present invention encompass details about catalyst compositions, reactants and organic oxygen-containing additive all of which are hereinafter disclosed in the following discussion of each of the facets of the present invention.

DETAILED DESCRIPTION OF THE INVENTION

It has been found that the performance of catalysts comprising at least one Group VIII non-noble metal component and at least two Group VIB metal components, the total of the Group VIII and Group VIB metal components, calculated as oxides, making up at least about 50 wt. % of the catalyst composition, calculated on dry weight, can be further improved by adding certain additives in such an amount that the molar ratio of the total of all additives to the total of the Group VIB metals and Group VIII non-noble metals employed in the process is at least about 0.01.

The preparation process according to the invention comprises two specific embodiments, namely a first embodiment wherein the catalyst is dried under such conditions that at least part of the additive is maintained in the catalyst composition, and a second less preferred, embodiment, wherein the catalyst composition is subjected to a calcination step at such conditions that the additive is removed from the catalyst.

It is noted that additive-containing catalysts and the preparation thereof are known in the art. Reference is made to EP 0601722, JP 04-166231, JP 04-166233, JP 06-339635, JP 06-210182 and WO 96/41848. However, these references are directed to conventional carrier based hydrotreating catalysts, which comprise up to about about 25 wt. % of molybdenum, calculated as trioxide, and up to about 10 wt. % of a Group VIII metal component, in particular nickel or cobalt, calculated as oxide on catalyst carrier which is generally alumina. The reason behind the increase in activity obtained in these references was believed to reside in the influence of the additive on the interaction between the metals-components and the alumina. There is nothing in these references which suggests to apply an additive in non-alumina-carrier based catalyst compositions. Additionally, none of these references deals with catalysts containing two Group VIB metal compounds.

In the context of the present specification, the wording "metal component" refers to a salt, oxide, sulfide, or any intermediate form between oxide and sulfide of the metal in question. As will be evident to the skilled person, the wording "at least two Group VIB metal components" is intended to refer to components of at least two Group VIB metals, e.g., the combination of molybdenum and tungsten.

The indications Group VIB and Group VIII used in the present specification correspond to the Periodic Table of Elements applied by Chemical Abstract Services (CAS system).

Suitable Group VIB metals include chromium, molybdenum, tungsten, or mixtures thereof, with a combination of molybdenum and tungsten being preferred. Suitable Group VIII non-noble metals include iron, cobalt, nickel, or mixtures thereof, preferably cobalt and/or nickel. Preferably, a combination of metal components comprising nickel, molybdenum, and tungsten or nickel, cobalt, molybdenum, and tungsten, or cobalt, molybdenum, and tungsten is employed in the process of the invention.

It is preferred that nickel and/or cobalt make up at least about 50 wt % of the total of Group VIII non-noble metals, more preferably at least about 70 wt %, still more preferably at least about 90 wt %. It may be especially preferred for the Group VIII non-noble metal to consist essentially of nickel and/or cobalt.

It is preferred that molybdenum and tungsten make up at least about 50 wt % of the total of Group VIB metals, more preferably at least about 70 wt %, still more preferably at least about 90 wt %. It may be especially preferred for the Group VIB metal to consist essentially of molybdenum and tungsten.

The molar ratio of Group VIB metals to Group VIII non-noble metals in the catalyst of the invention generally ranges from about 10:1–1:10 and preferably from about 3:1–1:3. The molar ratio of the different Group VIB metals one to the other generally is not believed to be critical. When molybdenum and tungsten are employed as Group VIB metals, the molybenum:tungsten molar ratio preferably lies in the range of about 9:1–1:19, more preferably about 3:1–1:9, most preferably about 3:1–1:6.

The catalyst composition comprises at least about 50 wt. % of the total of Group VIB and Group VIII metal components, calculated as oxides based on the total weight of the catalyst composition, preferably, at least about 70 wt. %, more preferably at least about 90 wt. %, calculated as oxides. The amount of Group VIB metals and Group VIII non-noble metals can be determined via AAS or ICP.

The additive used in the catalyst and process according to the invention is an organic oxygen-containing additive. In the context of the present specification the term organic oxygen-containing additive refers to an additive comprising at least one carbon atom, at least one hydrogen atom, and at least one oxygen additive. Suitable additives include, for example, acids, acid esters, alcohols, aldehydes, ketones and ethers.

Various groups of additives may be distinguished. A first group of additives includes those selected from the group of compounds comprising at least two oxygen atoms and 2–about 20 carbon atoms, preferably 2–about 10 carbon atoms and the compounds built up from these compounds. Preferably, the organic compounds of this group are substantially saturated, as is evidenced by a iodine number of less than about 60, preferably less than about 20. Organic compounds selected from the group of compounds comprising at least two oxygen-containing moieties, such as a carboxyl, carbonyl or hydroxyl moieties, and 2–about 10 carbon atoms and the compounds built up from these compounds are preferred. Examples of suitable compounds include citric acid, tartaric acid, oxalic acid, malonic acid, malic acid, butanediol, pyruvic aldehyde, glycolic aldehyde, and acetaldol. At this point in time, preference is given within this group to an additive that is selected from the group of compounds comprising at least two hydroxyl groups and 2–about 10 carbon atoms per molecule, and the (poly)ethers of these compounds. Suitable compounds from this group include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. This range can be extrapolated to include polyethers like polyethylene glycol. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Of these, ethylene glycol, diethylene glycol, triethylene glycol, tetraethylene glycol, proplylene glycol, dipropylene glycol, and polyethylene glycol with a molecular weight between about 200 and about 600 are preferred. Another group of compounds comprising at least two hydroxyl groups and 2–about 10 carbon atoms per molecule are the saccharides. Preferred saccharides include monosaccharides such as glucose and fructose. Ethers thereof include disaccharides such as lactose, maltose, and saccharose. Polyethers of these compounds include the polysaccharides.

A second group of oxygen-containing additives suitable for use in the present invention are those compounds comprising at least one covalently bonded nitrogen atom and at least one carbonyl moiety. This type of organic compound preferably comprises at least two carbonyl moieties. It is preferred that at least one carbonyl moiety is present in a carboxyl group. It is furthermore preferred that at least one nitrogen atom is covalently bonded to at least two carbon atoms. A preferred organic compound satisfies formula (I) or (II)

(R1R2)N—R3—N(R1'R2')  (I)

N(R1R2R1')  (II)

wherein R1, R2, R1' and R2' are independently selected from alkyl, alkenyl, and allyl, with up to 10 carbon atoms optionally substituted with one or more groups selected from carbonyl, carboxyl, ester, ether, amino, or amido. R3 is an alkylene group with up to about 10 carbon atoms which may be interrupted by —O— or —NR4—. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) or (II) comprises at least one carbonyl moiety.

Preferably, at least two of R1, R2, R1' and R2' (formula (I)) and at least two of R1, R2and R1' (formula (II)) have the formula —R5—COOX, wherein R5 is an alkylene group having 1–4 carbon atoms, and X is hydrogen or another cation, such as an ammonium, sodium, potassium and/or lithium cation. If X is a multivalent cation, one X can adhere to two or more —R5—COO groups. Typical examples of a compound of formula (I) are ethylene diamine(tetra)acetic acid (EDTA), hydroxyethylene diamine triacetic acid, and diethylene triamine pentaacetic acid. A typical example of a compound of formula (II) is nitrilotriacetic acid (NTA).

A further group of organic oxygen-containing compounds which are suitable as additives in the present invention are those described in WO 9425157. The unsaturated compounds, which have an iodine number of at least about 60, are preferred.

Oxygen-containing hydrocarbons within this group include, for example, higher alcohols having at least about 12, preferably at least about 16, more preferably at least 20 carbon atoms such as dodecanol, hexadecanol, oleyl alcohol, cetyl alcohol, hexacosanol, triacontanol, and octacosanol; higher ethers having at least about 12, preferably at least about 16, more preferably at least about 20 carbon atoms such as dicetyl ether; higher ketones having at least about 12 carbon atoms, preferably at least about 16 carbon atoms, more preferably at least about 20 carbon atoms such as palmitone, 10-hydroxypalmitone and 3-octadecanone; higher aldehydes having at least about 12 carbon atoms, preferably at least about 16, more preferably at least about 20 carbon atoms such as palmitaldehyde and olealdehyde; higher acids having at least about 12, preferably at least about 16, more preferably at least about 20 carbon atoms such as saturated acids such as lauric, myristic, palmitic, stearic, and docosanoic acids for example, or unsaturated higher acids such as palmitoleic, oleic, linoleic, linolenic, eleostearic, ricinoleic, eicosenoic, docosenoic, eicosatetraenoic, eicosapentaenoic, decosapentaenoic and docosahexaenoic; higher acid esters having at least about 12, preferably at least about 16, more preferably at least about 20 carbon atoms including mono-, di-, tri- and poly-fatty acid esters including alkyl and aryl esters of the above acids (e.g. benzyl oleate and butyl oleate) and esters of the above acids with mono-glyceride, di-glycerides and triglycerides and mixtures thereof. These glyceride fatty acid esters having from about 16 to about 100, more preferably about 18 to about 90, most preferably about 20 to about 80 carbon atoms are preferred. Suitable glyceride fatty acids are commercially available, as indicated in WO 9425157.

A single compound as well as a combination of compounds may be used as the additive.

The amount of additive used in the process according to the invention, and the amount of additive present in the catalyst according to the invention is at least about 0.01, preferably at least about 0.05, more preferably at least about 0.1 mole of additive per mole of the total of Group VIB and Group VIII metals. Generally, the molar ratio will be at most about 3, preferably at most about 2. However, the upper limit suitable for a specific situation may depend upon various parameters, such as the number of functional groups present in the organic oxygen-containing compound or the pore volume of the catalyst composition. It is within the scope of the skilled person to determine the amount of additive to be used in a specific situation.

From an environmental point of view, it is preferred to employ additives which are essentially free of sulfur. Further, sulfur-containing additives generally are not stable in relation to oxygen. Therefore, if sulfur-containing additives were to be employed, all subsequent process steps would have to be carried out under an inert atmosphere. Also for this reason it is preferred to employ sulfur-free additives.

The catalyst composition according to the invention may also comprise conventional catalyst components like binders or carrier materials, cracking components, conventional hydroprocessing catalysts, etc. For details on these compounds reference is made to non-prepublished international patent applications PCT/EP00/00354 and PCT/EP00/00355.

Examples of suitable binders and carrier materials are silica, silica-alumina, alumina, titania, titania-alumina, zirconia, boria, cationic clays or anionic clays such as saponite, bentonite, kaolin, sepiolite or hydrotalcite, and mixtures thereof. Preferred components are silica, silica-alumina, alumina, titania, titania-alumina, zirconia, bentonite, boria, and mixtures thereof, with silica, silica-alumina, and alumina being especially preferred.

Examples of suitable cracking components are crystalline cracking components such as zeolites, e.g., ZSM-5, (ultra-stable) zeolite Y, zeolite X, ALPOs, SAPOs, MCM-41, amorphous cracking components such as silica-alumina, and mixtures thereof. It will be clear that some materials, e.g., silica-alumina, may act as binder and cracking component at the same time.

If so desired, the catalyst composition may comprise any further materials such as phosphorus-containing compounds, boron-containing compounds, silicon-containing compounds, fluorine-containing compounds, additional transition metals, rare earth metals, or mixtures thereof.

According to the invention it is preferred for the amount of other components than Group VIB metal components, Group VIII metal components, and additive, to be below about 30 wt. %, preferably below about 20 wt. %. It may be preferred for the amount of other components to be below about 10 wt. %. A catalyst composition comprising 1–about 50 wt. %, preferably 1–about 30 wt. %, more preferably 1–about 10 wt. % of binder or carrier material, alumina in particular, may be preferred. In the above, the amount of other components than Group VIB metal components, Group VIII metal components, and additive are determined on the catalyst after calcination at about 500° C.

Generally, the catalyst composition of the invention has a mechanical strength, expressed as side crushing strength, of at least about 1 lbs/mm and preferably of at least about 3 lbs/mm (measured on extrudates with a diameter of about 1–2 mm).

Preferably, the catalyst composition in its oxidic state, i.e., prior to any sulfidation step, has a B.E.T. surface area of at least about 10 $m^2/g$, more preferably of at least about 50 $m^2/g$, and most preferably of at least about 80 $m^2/g$, as measured via the B.E.T. method. The median pore diameter (50% of the pore volume is below said diameter, the other 50% above it) of the oxidic catalyst composition preferably is about 3–25 nm, more preferably about 5–15 nm (determined by $N_2$ adsorption). The total pore volume of the oxidic catalyst composition generally is at least about 0.05 ml/g, preferably about 0.05–5 ml/g, more preferably of about 0.1–4 ml/g, still more preferably of about 0.1–3 ml/g, and most preferably of about 0.1–2 ml/g, as determined by nitrogen adsorption. To further increase the mechanical strength, it may be desirable for the oxidic catalyst composition of the invention to have a low macroporosity. Preferably, less than about 30%, more preferably less than about 20% of the pore volume of the catalyst composition is in pores with a diameter larger than about 100 nm (determined by mercury intrusion, contact angle: 130°).

The catalyst composition may have many different shapes. Suitable shapes include powders, spheres, cylinders, rings, and symmetric or asymmetric polylobes, for instance tri- and quadrulobes. Particles resulting from extrusion, beading or pelleting usually have a diameter in the range of about 0.2 to 10 mm, and their length likewise is in the range of about 0.5 to 20 mm. These particles are generally preferred. Powders, including those resulting from, e.g., spray-drying generally have a median particle diameter in the range of about 1 µm–100 µm, but deviations from this general range are possible.

In its oxidic state, the catalyst according to the invention has an X-ray diffraction pattern which is essentially amorphous with crystalline peaks at d=2.53 Å and d=1.70 Å.

The present invention also pertains to the catalyst composition according to the invention wherein the metal components have been converted partly or wholly into their sulfides. In that case, it is preferred for the catalyst to be essentially free from Group VIII non-noble metal disulfides. The Group VIII non-noble metals are preferably present as (Group VIII non-noble metal)$_y$S$_x$ with x/y being in the range of about 0.5–1.5, as can be determined by, e.g., XRD. Molybdenum and tungsten, if present, are preferably at least partly present in the sulfided catalyst as disulfides, as can be determined by, e.g., XRD. Chromium, if present, is preferably at least partly present as sulfide (CrS or $Cr_2S_3$), as can be determined by, e.g., XRD.

As stated above, the invention also pertains to a process for preparing a catalyst composition wherein at least one Group VIII non-noble metal component and at least two Group VIB metal components are combined and reacted in the presence of a protic liquid, after which the resulting composition is isolated and dried, the total of the Group VIII and Group VIB metal components, calculated as oxides, making up at least about 50 wt. % of the catalyst composition, calculated on dry weight. An organic oxygen-containing additive is added prior to, during, or subsequent to the combining and the metal components are reacted in such an amount that the molar ratio of the total amount of additive added to the total amount of Group VIII and Group VIB metal components is at least about 0.01.

For details about preparing a catalyst composition comprising at least one Group VIII non-noble metal component, at least two Group VIB metal components, the Group VIII and Group VIB metal components making up at least about 50 wt. % of the catalyst composition, calculated as oxides, reference is made to the aforementioned non-prepublished International patent applications PCT/EP00/00354 and PCT/EP00/00355.

Apart from the addition of the additive, the crux of the process according to the invention is that the metal components are reacted in the presence of a protic liquid. Any protic liquid which does not interfere with the reaction may be used. Suitable liquids include water, carboxylic acids, lower alcohols such as ethanol and propanol and mixtures thereof. The use of water is preferred.

The at least three metal components used in the process according to the invention, namely at least one Group VIII metal component and at least two Group VIB metal components may be in the solute state or at least partly in the solid state during the process of the invention. Thus, the reaction may involve three solute components, two solute components and one at least partly solid component, one solute component and two at least partly solid components, and three at least partly solid components. The reaction involves precipitation, and optionally, depending on the state of the various components, also dissolution and re-precipitation.

Generally, there are two possible ways of contacting the metal components with one another, namely by combining and reacting the metal components in solution to form a precipitate (hereinafter designated as the "solution route"), or by combining and reacting the metal components in the presence of a protic liquid with at least one of the metal components remaining at least partly in the solid state (hereinafter designated as the "solid route").

In the solution route, the metal components are completely dissolved when they are combined and/or reacted to form a precipitate. It is possible, e.g., to combine the metal components when they are already in the dissolved state and then have them react to form a precipitate. However, it is also possible to combine one or more of the metal components which are partly or entirely in the solid state with further metal components. However, in this case, care must be taken that the metal components that are partly or entirely in the solid state will dissolve when present in the reaction mixture. In other words, at least once during the solution route process, all metal components must be present wholly as a solution.

Precipitation can be effected by, e.g.,
(a) changing the pH during or after combination of the metal component solutions to such a value that precipitation is induced;
(b) adding a complexing agent during or after combination of the metal component solutions, which complexing agent complexes one or more of the metals to prevent precipitation of the metals, and thereafter changing the reaction conditions, such as temperature or pH, such that the complexing agent releases the metals for precipitation;
(c) adjusting the temperature during or after combination of the metal component solutions to such a value that precipitation is induced;
(d) lowering the amount of solvent during or after combination of the metal component solutions such that precipitation is induced;
(e) adding a non-solvent during or after combination of the metal component solutions to induce precipitation thereof, with a non-solvent meaning that the precipitate is essentially insoluble in this solvent; or
(f) adding an excess of either of the components to such an extent that precipitation is induced.

Adjusting the pH in, e.g., option (a) or (b) can be done by adding a base or an acid to the reaction mixture. However, it is also possible to add compounds which upon the temperature increasing will decompose into hydroxide ions or H+ ions, which increase and decrease the pH, respectively. Examples of compounds which will decompose upon the temperature increasing and thereby increase or decrease the pH are urea, nitrites, ammonium cyanate, ammonium hydroxide, and ammonium carbonate.

The solid route comprises combining and reacting the metal components, with at least one of the metal components remaining at least partly in the solid state. More in particular, it comprises adding the metal components to one another and simultaneously and/or thereafter reacting them. Consequently, in the solid route at least one metal component is added at least partly in the solid state and this metal component remains at least partly in the solid state during the entire reaction. The term "at least partly in the solid state" in this context means that at least part of the metal component is present as a solid metal component and, optionally, another part of the metal component is present as a solution in the protic liquid. A typical example of this is a suspension of a metal component in a protic liquid, where the metal is at least partly present as a solid, and optionally partly dissolved in the protic liquid.

It is possible to first prepare a suspension of a metal component in the protic liquid and to add, simultaneously or successively, solution(s) and/or further suspension(s) comprising metal component(s) dissolved and/or suspended in the protic liquid. It is also possible to first combine solutions either simultaneously or successively and to subsequently add further suspension(s) and optionally solution(s) either simultaneously or successively.

As long as at least one metal component is at least partly in the solid state during the solid route, the number of metal components which are at least partly in the solid state is not critical. Thus it is possible for all metal components to be combined in the solid route to be applied at least partly in the solid state. Alternatively, a metal component which is at least partly in solid state can be combined with a metal component which is in the solute state. E.g., one of the metal components is added at least partly in the solid state and, e.g., at least two and preferably two metal components are added in the solute state. In another embodiment, e.g., two metal components are added at least partly in the solid state and at least one and preferably one metal component is added in the solute state.

That a metal component is added "in the solute state" means that the whole amount of this metal component is added as a solution in the protic liquid.

As will be clear from the above, it is possible to add the Group VIII non-noble metal component and the Group VIB metal component in various ways: at various temperatures and pHs, in solution, in suspension, wetted or as such, simultaneously or sequentially. It should be noted that it is preferred that not to employ sulfur-containing metal components, as these components and the resulting products are not stable in relation to oxygen, which implies that all process steps subsequent to the addition of this metal component, even those at a lower temperature, will have to be applied under an inert atmosphere.

Suitable water-soluble Group VIII non-noble metal components to be used in the process of the invention include salts, such as nitrates, hydrated nitrates, chlorides, hydrated chlorides, sulfates, hydrated sulfates, formates, acetates, or hypophosphite. Suitable water-soluble nickel and cobalt components include nitrates, sulfates, acetates, chlorides, formates or mixtures thereof as well as nickel hypophosphite. Suitable water-soluble iron components include iron acetate, chloride, formate, nitrate, sulfate or mixtures thereof.

Suitable water-soluble Group VIB metal components include Group VIB metal salts such as ammonium or alkali metal monomolybdates and tungstates as well as water-soluble isopoly-compounds of molybdenum and tungsten, such as metatungstic acid, or water-soluble heteropoly compounds of molybdenum or tungsten comprising further, e.g., P, Si, Ni, or Co or combinations thereof. Suitable water-soluble isopoly- and heteropoly compounds are given in *Molybdenum Chemicals*, Chemical data series, Bulletin Cdb-14, February 1969 and in *Molybdenum Chemicals*, Chemical data series, Bulletin Cdb-12a-revised, November 1969. Suitable water-soluble chromium compounds include chromates, isopolychromates and ammonium chromium sulfate.

If the protic liquid is water, suitable Group VIII non-noble metal components which are at least partly in the solid state during the process of the invention comprise Group VIII non-noble metal components with a low solubility in water such as citrates, oxalates, carbonates, hydroxy-carbonates, hydroxides, phosphates, phosphides, sulfides, aluminates, molybdates, tungstates, oxides, or mixtures thereof. Oxalates, citrates, carbonates, hydroxy-carbonates, hydroxides, phosphates, molybdates, tungstates, oxides, or mixtures thereof are preferred, with hydroxy-carbonates and carbonates being most preferred. Generally, the molar ratio between the hydroxy groups and the carbonate groups in the hydroxy-carbonate lies in the range of about 0–4, preferably about 0–2, more preferably about 0–1 and most preferably about 0.1–0.8.

If the protic liquid is water, suitable Group VIB metal components which are at least partly in the solid state during contacting comprise Group VIB metal components with a low solubility in water, such as di- and trioxides, carbides, nitrides, aluminium salts, acids, sulfides, or mixtures thereof. Preferred Group VIB metal components which are at least partly in the solid state during contacting are di- and trioxides, acids, and mixtures thereof. Suitable molybdenum components include molybdenum di- and trioxide, molybdenum sulfide, molybdenum carbide, molybdenum nitride, aluminium molybdate, molybdic acids (e.g. $H_2MoO_4$), ammonium phosphomolybdate, or mixtures thereof, with molybdic acid and molybdenum di- and trioxide being preferred. Suitable tungsten components include tungsten di- and trioxide, tungsten sulfide ($WS_2$ and $WS_3$), tungsten carbide, orthotungstic acid ($H_2WO_4*H_2O$), tungsten nitride, aluminium tungstate (also meta- or polytungstate), ammonium phosphotungstate, or mixtures thereof, with orthotungstic acid and tungsten di- and trioxide being preferred.

If the protic liquid is water, the solubility of the Group VIII non-noble metal components and Group VIB metal components which are at least partly in the solid state during the process of the invention generally is less than 0.05 mol/(100 ml water at 18° C.).

As stated above, if so desired, a material selected from the group of binder materials, conventional hydroprocessing catalysts, cracking components, or mixtures thereof can be added prior to, during the combining and reacting of the metal components and/or subsequent thereto. These materials will be designated as "carrier materials" below.

The carrier material can be added prior to the contacting of the metal components by, e.g., combining it with one or more but not all of the metal components or vice versa, and by subsequently combining the mixture with the not yet added metal components either simultaneously or successively. The carrier material can be added during the contacting of the metal components by, e.g., simultaneously combining the carrier material and the metal components or first combining the metal components either simultaneously or successively and then adding the carrier material during the reaction of the combined metal components. The carrier material can be added subsequent to the contacting of the metal components by, e.g., adding it directly to the reaction mixture obtained after the reaction of the metal components or by adding it after any of the further process steps which will be discussed in detail below. Preferably, the carrier material is added subsequent to the contacting of the metal components. Optionally, the catalyst composition resulting after combining and reacting the metal components can be subjected to a solid-liquid separation before being composited with the carrier materials, e.g., filtration. After solid-liquid separation, a washing step may be carried out. Further, it is possible to thermally treat the catalyst composition prior to its being composited with the carrier materials. The carrier materials can be added in the dry state, either thermally treated or not, in the wetted and/or suspended state, as a filter cake, and/or as a solution.

The additive can be added prior to, during, or subsequent to the combining and reacting of the metal components. The additive can be added during the contacting of the metal components by, e.g., simultaneously combining the additive and the metal components or by first combining the metal components either simultaneously or successively and then adding the additive during the reaction of the combined metal components. Alternatively, a carrier material or any other material which has been composited with the additive can be added to the metal components during their combination and/or reaction. The additive can also be added subsequent to the contacting of the metal components by, e.g., adding it to the catalyst composition obtained after the reaction of the metal components. It is generally preferred to incorporate the additive into the catalyst composition subsequent to the combining and reacting of the metal compounds. It is also possible to add the additive to a used or regenerated catalyst.

If a carrier material is added, the sequence in which the carrier material and the additive are added is not critical. It is possible to first combine the carrier material with the additive and combine the combination with the metal components. It is also possible to combine the metal components with the additive and the carrier material in any sequence.

Optionally, the process of the present invention may comprise the further process steps of spray-drying, (flash) drying, milling, kneading, slurry-mixing, dry or wet mixing, shaping, and/or calcining. Dry mixing means mixing the catalyst composition in the dry state with any of the above materials in the dry state. Wet mixing, e.g., comprises mixing the wet filter cake comprising the catalyst composition and optionally any of the above materials as powders or wet filter cake to form a homogenous paste thereof. Shaping comprises, e.g., extrusion, pelletizing, beading and/ or spray-drying. For details in respect of these further process steps, reference is made to the aforementioned non-prepublished international patent applications PCT/EP00/00354 (heading "Catalyst preparation process" under "Further optional process steps") and PCT/EP00/00355 (heading "Process of the invention" under "(B) Subsequent process steps").

It is generally preferred for the process according to the invention to comprise a shaping step. The shaping step is preferably carried out after the combining and reacting of the metal components. If a carrier material is to be added in the process according to the invention, it is preferably added before the shaping step is carried out. The additive may be added either before or after the shaping step, although adding the additive after the shaping step may be preferred.

The preparation process according to the invention comprises two specific embodiments, namely a first, at this point in time preferred, embodiment wherein the catalyst is dried under such conditions that at least part of the additive is maintained in the catalyst composition, and a second, at this point in time less preferred, embodiment, wherein the catalyst composition is subjected to a calcination step at such conditions that the additive is removed from the catalyst. This calcination step, if present, will generally be carried out at a temperature of about 100–600° C., more in particular about 150–450° C., still more in particular about 250–450° C. The calcination time generally varies from about 0.5 to 48 hours. The calcination may be carried out in an inert gas such as nitrogen, or in an oxygen-containing gas, such as air or pure oxygen, optionally in the presence of steam. Preferably, the calcination is carried out in an oxygen-containing atmosphere. The exact temperature of the calcination step will depend on the temperature necessary to remove the additive from the catalyst. If it is intended to dry the catalyst under such conditions that at least part of the additive remains in the catalyst, the drying temperature to be applied also depends heavily on the temperature at which the additive present in the catalyst boils or decomposes. Of course, it is preferred to keep as much additive as possible in the catalyst during any such treatment, but with the more volatile additives their evaporation during such treatment cannot always be avoided. Generally, it is advantageous to have a temperature during any such treatment below about 300° C. and preferably below about 220° C., although a lower temperature may be necessary, depending on the nature of the additive present in the catalyst.

The process according to the invention may also comprise an intermediate calcination step, carried out before the additive in incorporated into the catalyst composition. If such intermediate calcination step, which can be carried out under the conditions specified above, is applied, this is generally done after the shaping step, if present. This may, inter alia, be useful to convert a carrier material precursor, e.g., an alumina precursor such as boehmite, into a carrier material like gamma-alumina.

If so desired, the additive-containing catalyst composition, or if a calcination is applied, the calcined catalyst composition may be subjected to sulfidation. Sulfidation can, e.g., be carried out be carried out in the gaseous or the liquid phase. It generally is carried out by contacting the precipitate with a sulfur-containing compound such as elementary sulfur, hydrogen sulfide, DMDS, or polysulfides. The sulfidation can generally be carried out in situ and/or ex situ. Preferably, the sulfidation is carried out ex situ, i.e. the sulfidation is carried out in a separate reactor prior to the sulfided catalyst composition being loaded into the hydroprocessing unit. Furthermore, it is preferred that the catalyst composition is sulfided both ex situ and in situ.

Two preferred embodiments of the preparation process according to the invention will be elucidated below.

A first embodiment is a process comprising the successive steps of combining and reacting the metal components in a protic liquid, optionally isolating the reaction product, optionally washing, drying and/or thermally treating the resulting material, optionally mixing the resulting catalyst composition with a carrier material, shaping the resulting composition, e.g., by spray-drying or extrusion, optionally calcining the resulting composition, adding an additive to the shaped particles, optionally ageing the additive-containing composition, followed by optional drying, calcination, and/or sulfidation of the catalyst particles. A more preferred version of this embodiment comprises the steps of combining and reacting the metal components in a protic liquid, isolating the reaction product, optionally mixing the resulting catalyst composition with a carrier material, shaping the resulting composition, e.g., by spray-drying or extrusion, calcining the resulting composition, adding an additive to the shaped particles, followed by drying, optional calcination, and/or sulfidation of the catalyst particles.

A second embodiment is a process comprising the successive steps combining and reacting the metal components in a protic liquid, optionally isolating the resulting product, e.g., by filtration, optionally washing, drying and/or thermally treating the resulting catalyst composition, mixing the resulting catalyst composition with an additive and optionally a carrier material, shaping the resulting composition, e.g., by spray-drying or extrusion, followed by optional drying, calcination, and/or sulfidation of the catalyst composition. A more preferred version of this embodiment comprises the steps of combining and reacting the metal components in a protic liquid, isolating the resulting product, e.g., by filtration, mixing the resulting catalyst composition with an additive and optionally a carrier material, shaping the resulting composition, e.g., by spray-drying or extrusion, followed by drying, optional calcination, and/or sulfidation of the catalyst composition.

Use According to the Invention

The catalyst composition according to the invention can be used in virtually all hydroprocessing processes to treat a plurality of feeds under wide-ranging reaction conditions, e.g., at temperatures in the range of about 200° to about 450° C., hydrogen pressures in the range of about 5 to 300 bar, and space velocities (LHSV) in the range of about 0.05 to 10 $h^{-1}$. The term "hydroprocessing" in this context encompasses all processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulfurization, hydrodenitrogenation, and hydrodearomatization of hydrocarbon feedstocks. Suitable feedstocks are, e.g., middle distillates, kero, naphtha, vacuum gas oils, and heavy gas oils. Conventional process conditions can be applied, such as temperatures in the range of about 250°–450° C., pressures in the range of about 5–250 bar, space velocities in the range of about 0.1–10 $h^{-1}$, and $H_2$/oil ratios in the range of about 50–2000 Nl/l.

Characterization Methods (a) Side Crushing Strength (SCS)

First, the length of, e.g., an extrudate particle is measured and then the extrudate particle is subjected to compressive loading (25 lbs in 8.6 sec.) by a movable piston. The force required to crush the particle is measured. The procedure is repeated with at least 40 extrudate particles and the average is calculated as force (lbs) per unit length (mm). This method is applied to shaped particles with a length not exceeding 7 mm.

(b) Pore Volume ($N_2$-adsorption)

The pore volume determination by way of $N_2$ adsorption is carried out as described in the PhD thesis of J. C. P. Broekhoff (University of Technology Delft 1969).T

EXAMPLES

Comparative Example A

A catalyst composition was prepared by combining and reacting nickel hydroxy-carbonate, $MoO_3$ and $H_2WO_4$ in an aqueous medium. The resulting suspension was filtered. The wet filter cake was mixed with wet alumina cake. During the mixing, the temperature was somewhat increased. In this way, the water content of the mixture was reduced to obtain an extrudable mix. The mixture was then extruded, dried at 120° C. and calcined at 300° C. The resulting catalyst composition contained 18 wt % $MoO_3$, 32 wt % $WO_3$, 31 wt % NiO, and 17 wt % $Al_2O_3$.

Example 1

The extrudates resulting from Comparative Example A were impregnated with 0.12 mol diethyleneglycol (ex. Merck) per mol nickel, molybdenum and tungsten contained in the catalyst composition. The diethylene glycol was added as an aqueous solution, with the volume adjusted to be suitable for pore volume impregnation. The impregnated extrudates were dried in air at 140° C.

Example 2

A catalyst composition was prepared by combining and reacting nickel hydroxy-carbonate, $MoO_3$ and $H_2WO_4$ in an aqueous medium. The resulting suspension was filtered. The wet filter cake was mixed with wet alumina cake. The resulting mixture contained 20 wt % $MoO_3$, 33 wt % $WO_3$, 31 wt % NiO, and 16 wt % $Al_2O_3$ (measured on dry base). To the resulting mixture, 0.12 mol diethyleneglycol (ex. Merck) were added per mol nickel, molybdenum and tungsten contained in the mixture. During the further mixing, the temperature of the mix was somewhat increased. In this way, the water content of the mixture was reduced to obtain an extrudable mix. The additive-containing mixture was extruded and the resulting extrudates were dried overnight at 120° C.

Example 3

The catalysts of Comparative Example A, Example 1, and Example 2 were tested in hydrodesulfurization using a treated diesel feedstock having the following characteristics:
S content: 217 ppm
N content: 29 ppm
amount of monoaromatic hydrocarbons: 31.3 wt %
amount of diaromatic hydrocarbons: 5.8 wt %
amount of triaromatic hydrocarbons: 0.6 wt %
initial boiling point: 161° C.
final boiling point: 423° C.

The following process conditions were applied during the test:
LHSV (space velocity): 1.8 $h^{-1}$
$H_2$/oil ratio: 300 Nl/l
pressure: 30 bar
temperature: 325° C.

The relative hydrodesulfurization activity (on weight basis, calculated on the weight of the catalyst less the weight of the additive, if any) of the catalyst of Examples 1 and 2 were 124 and 147, respectively, with the activity of the catalyst of Comparative Example A being taken as 100. The addition of the organic compound thus clearly improves the catalysts' performance.

Comparative Example B

A catalyst composition was prepared by combining and reacting nickel hydroxy-carbonate, $MoO_3$ and $H_2WO_4$ in an aqueous medium. The resulting suspension was filtered. The resulting wet filter cake was dried at 140° C. The dried material was crushed and pelletized. The resulting pellets contained 24 wt % $MoO_3$, 39 wt % $WO_3$ and 37 wt % NiO.

Example 4

A catalyst composition was prepared as described in Comparative Example B except that wet filter cake resulting after the filtration of the suspension was mixed with 0.12 mol diethylene glycol per mol nickel, molybdenum and tungsten contained in the filter cake.

Example 5

The catalyst compositions of Comparative Example B and Example 4 were tested in the removal of polynuclear aromatic compounds from a treated diesel feedstock. The feedstock characteristics and the process conditions were as described in Example 3. The relative activity (on weight basis, calculated on the weight of the catalyst less the weight of the additive, if any) of the catalyst of Example 4 was measured to be 118 with the activity of the catalyst of Comparative Example B being taken as 100. The addition of the organic compound thus clearly improves the catalyst's performance.

What is claimed is:

1. A process for preparing a hydrocarbon feedstock hydroprocessing catalyst composition wherein at least one Group VIII non-noble metal component and at least two Group VIB metal components are combined and reacted in the presence of a protic liquid, after which the resulting composition is isolated and dried, the total of the Group VIII and Group VIB metal components, calculated as oxides, making up at least about 70 wt. % of the catalyst composition, calculated on dry weight, an organic oxygen-containing additive is added prior to, during, or subsequent to the combining and reacting of the metal components in such an amount that the molar ratio of the total amount of additive added to the total amount of Group VIII and Group VIB metal components is at least about 0.01.

2. The process of claim 1 wherein the catalyst is dried under such conditions that at least part of the additive is maintained in the catalyst composition.

3. The process of claim 1, wherein the catalyst composition is subjected to a calcination step at such conditions that the additive is removed from the catalyst.

4. The process of claim 1 wherein the metal components are combined and reacted in solution to form a precipitate.

5. The process of claim 1 wherein at least one of the metal components remains at least partly in the solid state during the entire process.

6. The process of claim 1 wherein the organic additive is selected from the group of compounds comprising at least two oxygen atoms groups and 2–about 20 carbon atoms and the compounds built up from these compounds.

7. The process of claim 1 wherein the organic additive is selected from the group of compounds comprising at least two hydroxyl groups and 2–about 20 carbon atoms and the compounds built up from these compounds.

8. The process of claim 7 wherein the additive is at least one compound selected from ethylene glycol, diethylene glycol, polyethylene glycol, saccharide, or polysaccharide.

9. The process of claim 1 wherein the additive satisfies the formula (I) (R1R2)N —R3—N(R1'R2') or formula (II) N(R1R2R1') wherein R1, R2, R1' and R2' are independently selected from alkyl, alkenyl, and allyl, with up to about 10 carbon atoms optionally substituted with one or more groups selected from carbonyl, carboxyl, ester, ether, amino, or amido, and R3 is an alkylene group with up to about 10 carbon atoms which may be interrupted by —O— or —NR4—, R4 being selected from the same group as indicated above for R1, which R3 alkylene group may be substituted with one or more groups selected from carbonyl, carboxyl, ester, ether, amino, or amido, with the proviso that the organic compound of formula (I) or (II) comprises at least one carbonyl moiety.

10. The process of claim 9 wherein the additive is selected from ethylene diamine(tetra)acetic acid (EDTA), hydroxyethylene diamine triacetic acid, and diethylene triamine pentaacetic acid, and nitrilotriacetic acid (NTA).

11. The process of claim 1 wherein the additive is an ester of fatty acid(s) having at least about 12 carbon atoms.

12. The process of claim 1 wherein the additive is an ester of fatty acid(s) having at least about 16 atoms.

13. The process of claim 1 wherein the additive is an ester of fatty acid(s) having at least about 20 carbon atoms.

14. The process of claim 11 wherein the acid ester is an ester of fatty acid(s) with mono-glyceride, diglyceride, or triglyceride.

15. The process of claim 1 which includes a sulfidation step.

16. A hydrocarbon feedstock hydroprocessing catalyst composition comprising at least one Group VIII non-noble metal component and at least two Group VIB metal components, wherein the catalyst composition further comprises at least about 0.01 mole of an organic oxygen-containing additive per mole of the total of Group VIB metals and Group VIII non-noble metals present in the catalyst composition, the total of the Group VIII and Group VIB metal components, calculated as oxides, making up at least about 70 wt. % of the catalyst composition, calculated on dry weight.

17. The catalyst composition of claim 16 wherein the Group VIII and Group VIB metal components make up at least about 90 wt % of the catalyst composition, calculated as oxides.

18. The catalyst composition of claim 16 wherein the Group VIII non-noble metal component comprises cobalt, nickel, iron, or mixtures thereof.

19. The catalyst composition of claim 16 wherein nickel and cobalt make up at least about 50 wt. % of the total of Group VIII non-noble metal components.

20. The catalyst composition of claim 19 wherein nickel and cobalt make up at least about 70 wt. % of substantially all of the Group VIII non-noble metal components.

21. The catalyst composition of claim 19 wherein nickel and cobalt make up at least about 90 wt. % of the Group VIII non-noble metal components.

22. The catalyst composition of claim 16 wherein the Group VIB metal component comprises at least two of molybdenum, tungsten, and chromium.

23. The catalyst composition of claim 22 wherein molybdenum and tungsten make up at least about 50 wt. % of substantially all of the Group VIB metal components.

24. The catalyst composition of claim 22 wherein molybdenum and tungsten make up at least about 70 wt. % of all of the Group VIB metal components.

25. The catalyst composition of claim 22 wherein molybdenum and tungsten make up at least about 90 wt. % of all of the Group VIB metal components.

26. The catalyst composition of claim 16 wherein the organic additive is selected from the group of compounds comprising at least two oxygen atoms groups and 2–about 20 carbon atoms and the compounds built up from these compounds.

27. The catalyst composition of claim 16 wherein the organic additive is selected from the group of compounds comprising at least two hydroxyl groups and 2–about 20 carbon atoms and the compounds built up from these compounds.

28. The catalyst composition of claim 27 wherein the additive is at least one compound selected from ethylene glycol, diethylene glycol, polyethylene glycol, saccharide, or polysaccharide.

29. The catalyst composition of claim 16 wherein the additive satisfies formula (I) (R1R2)N—R3—N(R1'R2')) or formula (II) N(R1R2R1') wherein R1, R2, R1' and R2' are independently selected from alkyl, alkenyl, and allyl, with up to about 10 carbon atoms optionally substituted with one or more groups selected from carbonyl, carboxyl, ester, ether, amino, or amido, and R3 is an alkylene group with up to about 10 carbon atoms which may be interrupted by —O— or —NR4—, R4 being selected from the same group as indicated above for R1, which R3 alkylene group may be substituted with one or more groups selected from carbonyl, carboxyl, ester, ether, amino, or amido, with the proviso that the organic compound of formula (I) or (II) comprises at least one carbonyl moiety.

30. The catalyst composition of claim 29 wherein the additive is selected from ethylene diamine(tetra)acetic acid (EDTA), hydroxyethylene diamine triacetic acid, and diethylene triamine pentaacetic acid, and nitrilotriacetic acid (NTA).

31. The catalyst composition of claim 16 wherein the additive is an ester of fatty acid(s) having least about 12 carbon atoms.

32. The catalyst composition of claim 31 wherein the additive is an ester of fatty acid(s) having least about 16 carbon atoms.

33. The catalyst composition of claim 31 wherein the additive is an ester of fatty acid(s) having least about 20 carbon atoms.

34. The catalyst of claim 31 wherein the acid ester is an ester of fatty acid(s) with mono-glyceride, diglyceride, or triglyceride.

35. The catalyst composition of claim 16 which comprises one or more compounds selected from the group of binder materials, conventional hydroprocessing catalysts, cracking components, or mixtures thereof.

36. The catalyst composition of claim 35 which comprises 1–about 50 wt. % of a binder or carrier material.

37. The catalyst composition of claim 35 which comprises 1–about 30 wt. % of a binder or carrier material.

38. The catalyst composition of claim 35 which comprises 1–about 10 wt. % of a binder or carrier material.

39. The catalyst composition of claim 35 wherein said binder or carrier material comprises alumina.

* * * * *